United States Patent [19]
Ikeda

[11] 3,938,028
[45] Feb. 10, 1976

[54] VOLTAGE REGULATOR FOR A SEPARATELY EXCITED GENERATOR

[75] Inventor: Yoshihiko Ikeda, Susono, Japan

[73] Assignee: Kokusan Denki Co., Ltd., Numazu, Japan

[22] Filed: July 5, 1974

[21] Appl. No.: 485,984

[30] Foreign Application Priority Data

July 9, 1973  Japan.......................... 48-80540[U]

[52] U.S. Cl. ...................... 322/28; 322/25; 322/68
[51] Int. Cl.² .......................................... H02P 9/26
[58] Field of Search ...... 322/25, 28, 19, 68, DIG. 3, 322/27, 73; 320/64, 68

[56]  References Cited
UNITED STATES PATENTS

| | | | |
|---|---|---|---|
| 2,996,654 | 8/1961 | Livingston | 322/25 |
| 3,179,874 | 4/1965 | Guennou | 322/27 X |
| 3,217,229 | 11/1965 | Ballard | 320/68 |
| 3,454,860 | 7/1969 | Burkett et al. | 322/68 X |
| 3,758,843 | 9/1973 | Ishizaki et al. | 322/25 |

Primary Examiner—R. N. Envall, Jr.
Assistant Examiner—Robert J. Hickey
Attorney, Agent, or Firm—Woodling, Krost, Granger & Rust

[57]  ABSTRACT

A voltage regulator for a separately excited generator including a main generator unit having generating winding means and exciting winding means and an exciter comprising a magnet field type generator with the output connected through a rectifier to said exciting winding means, said voltage regulator comprising thyristor means connected to said output of said exciter to short the AC output from said exciter from being supplied to said exciting winding means of said main generator unit characterized by further comprising a voltage divider including first electric resistance means non-linear in voltage to current characteristic, and second electric resistance means said voltage divider connected to the output of said generating winding means of said main generator, with the output voltage across said first electric resistance means of said voltage divider connected through a Zener diode to the gate of said thyristor means.

5 Claims, 10 Drawing Figures

U.S. Patent  Feb. 10, 1976  3,938,028
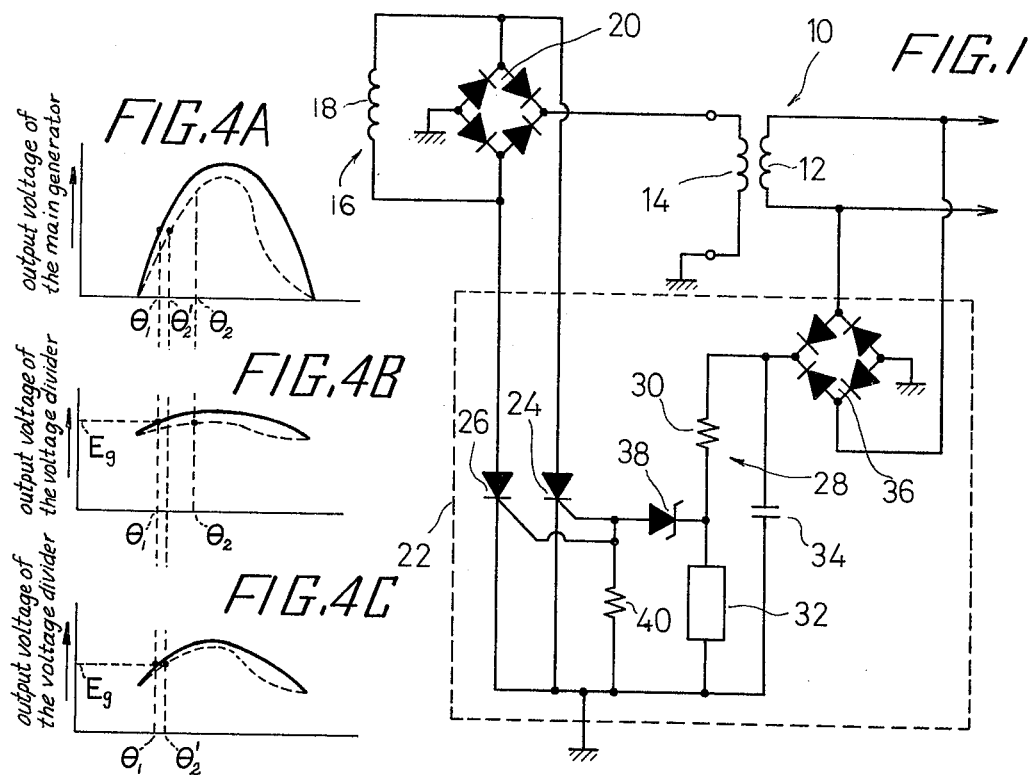
FIG.1
FIG.4A — output voltage of the main generator
FIG.4B — output voltage of the voltage divider
FIG.4C — output voltage of the voltage divider
FIG.2A
FIG.2B
FIG.2C
FIG.2D
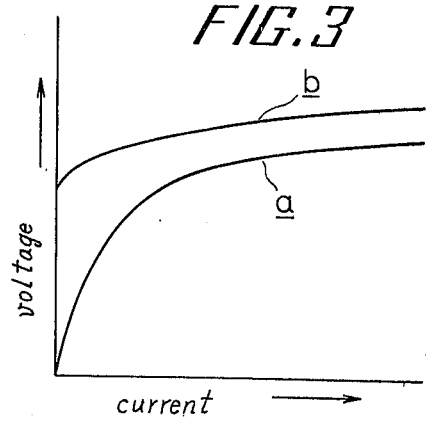
FIG.3
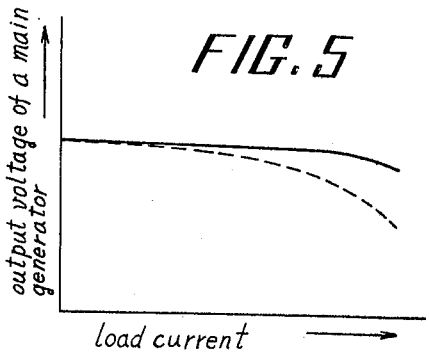
FIG.5

VOLTAGE REGULATOR FOR A SEPARATELY EXCITED GENERATOR

FIELD OF THE INVENTION

This invention pertains generally to a voltage regulator for a separately excited generator and more particularly to a voltage regulator for a separately excited generator driven by a prime mover such as an internal combustion engine revolving at varied speed.

BACKGROUND OF THE INVENTION

An AC generator is well known which has field or exciting winding means supplied with a rectified exciting current from a single phase or multiple phase magnet field type AC generator. The excited AC generator will be referred to as main generator and the magnet field type AC generator will be referred to as exciter, hereinafter. Such main generator has usually employed a voltage regulator comprising thyristor means serving to partially short the AC output or exciting power from the exciter under control responsive to the signal detected from the main generator. In the prior arts, such detection of the output of the main generator has been effected by a voltage divider including linear resistance means connected to the output of the main generator. When the signal reaches a predetermined level, thyristor means is adapted to be turned on for shorting the exciting current from being supplied to exciting winding means. However, because of such voltage divider detecting a signal of the substantially same waveform as that of the output voltage of the main generator, when it is applied with electrical load so that the load current flows from the main generator to the load, the voltage regulator has never been capable of properly regulating the output voltage of the main generator. More particularly, where the main generator is under no load, thyristor means is to be turned on in an advanced phase of a cycle at more than predetermined level of the output of the main generator, but where the main generator is under load, thyristor means is required to be turned on in a relatively delayed phase at predetermined level of the output of the main generator. Nevertheless, the prior voltage regulator tends to turn on thyristor means in the advanced phase even where the main generator is under load because the detected signal has a steep rise of the curve due to its waveform being substantially identical to that of the output of the main generator. Thus, the conventional voltage regulator has the disadvantage of the output of the main generator under load decreasing as the load current becomes larger, resulting in improper regulation of the output of the main generator.

OBJECT OF THE INVENTION

Accordingly, it is a principal object of the present invention to provide a voltage regulator for a separately excited generator adapted to provide a substantially constant output voltage from the excited generator even though the load current increases.

SUMMARY OF THE INVENTION

In accordance with the present invention, there is provided a voltage regulator for a separately excited generator including a main generator unit having generating winding means and exciting winding means and an exciter comprising a magnet field type generator with the output connected to said exciting winding means of said main generator unit, said voltage regulator comprising thyristor means connected to said output of said exciter to short the exciting power from said exciter from being supplied to said exciting winding means of said main generator unit, characterized by further comprising a voltage divider including first electric resistance means non-linear in voltage to current characteristic, and second electric resistance means said voltage divider connected to the output of said generating winding means of said main generator unit, with the output voltage across said first electric resistance means of said voltage divider connected through a reversely disposed Zener diode to the gate of said thyristor means to turn on said thyristors when the output voltage of said divider reaches the Zener voltage of said Zener diode.

BRIEF DESCRIPTION OF THE DRAWING

The above and other objects and features of the present invention will be apparent from the teaching of preferred embodiments of the present invention taken with reference to the accompanying drawing in which;

FIG. 1 is a schematic diagram of a voltage regulator for a separately excited generator in accordance with the present invention;

FIGS. 2A through 2D show several embodiments of non-linear resistance means involved in a voltage divider in the voltage regulator of FIG. 1;

FIG. 3 shows curves of voltage to current characteristic of non-linear resistance means;

FIGS. 4A, 4B and 4C show curves of half cycles of the output voltages from the main generator and from the voltage divider, according to the present invention and from a conventional voltage divider respectively;

FIG. 5 shows the output voltage from the main generator under load relative to the load current therefrom.

DETAILED DESCRIPTION OF PREFERRED EMBODIMENTS OF THE INVENTION

Referring now to FIG. 1, a main generator unit is indicated generally at numeral 10 and comprises a generating or armature winding 12 and an exciting or field winding 14. The generating winding has the output connected to load (not shown) such as a battery, an ignition circuit, a lamp circuit and so on. While only one generating winding 12 is shown in FIG. 1, a plurality of generating windings may be provided in the unit. In order to excite the main generator is provided an exciter 16 in the form of a magnet field type AC generator which comprises a generating or armature winding 18 with the output connected to an AC terminal of a fullwave rectifier 20, the DC terminal of which at one end is grounded and at the other end connected to one end of the exciting winding 14 of the main generator unit 10 with the other end grounded.

A voltage regulator 22 comprises two thyristors 24 and 26 with the anodes connected to the respective AC terminals of the fullwave rectifier 20 and the cathodes connected to ground. The thyristors 24 and 26 serve to short the AC output current of the exciter 16 from flowing through the exciting winding 14 of the main generator 10 as described later herein. The voltage regulator 22 also comprises a voltage divider 28 to detect the output voltage of the main generator 10. The voltage divider includes a first and electric resistance means 32 having a non-linearly varied voltage to current characteristic and second electric resistor 30. A smoothing capacitance 34 may be connected in parallel to the voltage divider 28. A fullwave rectifier 36 may be provided having the AC terminals connected to the respective output terminals of the main generator 10 with one of the DC output terminals connected to one of the ends of the voltage divider 28, that is the outer end of the second electric resistor 30 and the other DC output terminal connected to ground. The outer end of non-linear electric resistance means is connected to ground. Non-linear electric resistance means may be in any suitable form, but may preferably include a varistor or varistors, a diode or diodes, a Zener diode or diodes and the combination of any of the foregoing semconductors or of any of them and a linear electric resistor or resistors. Several examples of non-linear electric resistance means are shown in FIG. 2A to 2D. FIG. 2A shows non-linear electric resistance means comprising a varistor. FIG. 2B shows non-linear electric resistance means comprising the combination of a linear electric resistor and a varistor. FIG. 2C shows non-linear electric resistance means comprising the combination of a varistor and a diode. Lastly, FIG. 2D shows non-linear electric resistance means comprising a linear electric resistor and a Zener diode. It will be understood that any other non-linear electric resistance means may be used corresponding to the desired detected voltage by the voltage divider 28. FIG. 3 shows the voltage to current characteristics $a$ and $b$ of non-linear electric resistance means of FIG. 2A. The characteristics $a$ and $b$ of FIG. 3 depend approximately on the index of the particular varistors. It will be understood that these characteristics can be varied by combining them with a linear electric resistor (see FIG. 2B) or with a diode (see FIG. 2C). Non-linear electric resistance means of FIG. 2D has the characteristic substantially identical to that of a single varistor. The varistor used for non-linear electric resistance means may include a commercially available silicone varistor which preferably has the thermally stable characteristic.

In order to determine the conducting phase of the thyristors 24 and 26, there is provided a Zener diode 38 the cathode of which is connected to the point of connection between the linear electric resistor 30 and non-linear electric resistance means 32 or the output of the voltage divider 28 and the anode of which is connected to the gates of the thyristors 24 and 26. An electric resistor 40 is connected between the gates and cathodes of the thyristors 24 and 26, serving to protect the thyristors from the varied temperature and the surge voltage.

Referring now to the operation of the present voltage regulator, the output of the main generator 10 is partially fully rectified by the fullwave rectifier 36 and the rectified output is then supplied to the voltage divider 28. While the voltage across non-linear electric resistance means 32 that is the output voltage of the voltage divider 28 is below the Zener voltage of the Zener diode 38, resulting from the relatively lower revolution number of the engine by which the main generator is driven, no gate current flows through the thyristors 24 and 26 due to the non-conductive condition of the Zener diode 38 and therefore, the thyristors 24 and 26 are in the non-conductive condition. Thus, the whole current is supplied from the exciter 16 through the fullwave rectifier 20 to the exciting winding 14 of the main generator 10 for operation thereof. When the AC output voltage of the main generator increases resulting from the increased revolution number of the engine until the output voltage of the voltage divider 28 exceeds the Zener voltage of the Zener diode 38, the gate current flows through the gates cathodes of the thyristors 24 and 26 so that they are turned on when the voltage is applied across the anodes and cathodes of the thyristors 24 and 26 with the positive polarities at the anodes of the thyristors. Thus, the exciting power from the exciter 16 to the main generator 10 decreases resulting in the resultant decreasing output voltage from the main generator 10. It should be noted that the output voltage of the voltage divider 28 has the waveform nearly clamped at the head as shown in FIG. 4B. The solid line of FIG. 4A shows one half cycle of the output voltage of the main generator 10 while the main generator is under no load and the solid line of FIG. 4B shows the output voltage of the voltage divider 28 corresponding to the voltage represented by the solid line of FIG. 4A. On the other hand, the dotted line of FIG. 4A shows one half cycle of the output voltage of the main generator 10 while the main generator 10 is under load and the dotted line of FIG. 4B shows the output voltage of the voltage divider 28 corresponding to the voltage represented by the dotted line of FIG. 4A. The output voltages shown in FIG. 4B are obtained by non-linear electric resistance means of FIG. 2A. Provided that when the detected voltage reaches $E_g$, the thyristors 24 and 26 are turned on, they are conductive at the phase angle of $\theta_1$ under no load, but at the phase angle of $\theta_2$ which is delayed relative to the phase angle $\theta_1$, under load.

The novel features of the present invention will become more apparent from the following explanation of the difference between the present invention and the prior art. In prior art, the non-linear resistance means 32 of the present invention is not employed and, instead, a linear resistance means is employed. So, suppose, in FIG. 1, that the non-linear resistance means is replaced by a linear resistance means. Then, the output of the voltage divider 28 is as shown by the dotted line in FIG. 4C. The thyristors 24 and 26 are turned on when the output voltage of the divider 28 reaches $E_y$. When the main generator 10 is under load, the thyristors 24 and 26 are turned on at the phase angle $\theta_1$ so that the exciting current is fed to the exciting winding 14 during the phase interval of 0° to $\theta_1$. When the main generator 10 is under load, it is necessary to turn on the thyristors 24 and 26 at an angle such as $\theta_2$ as shown in FIG. 4B substantially lagging behind the angle $\theta_1$ so as to feed larger exciting power to the exciting winding 14. However, with the linear resistance means, the thyristors 24 and 26 are turned on at the angle $\theta_2'$ which is close to $\theta_1$. Therefore, the exciting power fed to the exciting winding 14 is insufficient, resulting in inadequate output voltage of the main generator 10. For this reason, with the prior art voltage regulator, the output voltage of the main generator tends to decrease with increasing load current as shown by the dotted line in FIG. 5. The difference between the solid line and the dotted line of FIG. 5, hence the difference in the output voltage to load characteristic between the present invention and the prior art is attributable to the difference between the output voltages of the voltage dividers. As was already explained, the peaks of the output voltage of the voltage divider of the present invention are clamped as is shown in FIG. 4B. This effect can be utilized to design the voltage divider so that the output voltage of the divider may reach the level $E_g$ at a phase angle $\theta_2$ much later than the angle $\theta_1$ when the main generator 10 is under load and the output voltage of the divider may reach the level $E_g$ at a phase angle substantially the same as the angle $\theta_1$ of the prior art when the main generator 10 is under no load. The fact that the output voltage of the divider reaches the level $E_g$ at a later angle when the main generator is under load leads to later turn-on of the thyristors and in turn to larger exciting power fed to the exciting winding, resulting in higher output voltage of the main generator. Thus, according to the present invention, the effective value of the output voltage of the main generator is kept constant as the load current is increased.

While some embodiments of the present invention have been shown and described in connection with the accompanying drawing, it will be understood that various modifications and changes might be made within the scope and spirit of the present invention, which has been difined only to the appended claims.

What is claimed is:

1. A voltage regulator for a separately excited generator including a main generator unit having generating winding means and exciting winding means and an exciter comprising a magnet field type generator with the output connected through a rectifier to said exciting winding means of said main generator unit, said voltage regulator comprising thyristor means connected to said output of said exciter to short the AC output from said exciter from being supplied to said exciting winding means of said main generator unit, a voltage divider with the input connected through a rectifier to the output of said generating winding means of said main generator unit, said voltage divider comprising first electric resistance means and second electric resistance means, and a Zener diode, the cathode of said Zener diode being connected to the point of connection between said first electric resistance means and said second electric resistance means and the anode of said Zener diode being connected to the gate of said thyristor means, characterized in that said first electric resistance means of said voltage divider is non-linear in voltage to current characteristic.

2. A voltage divider as set forth in claim 1, wherein said non-linear electric resistance means comprises a varistor.

3. A voltage regulator as set forth in claim 1, wherein said non-linear electric resistance means comprises the combination of a varistor and a linear electric resistor.

4. A voltage regulator as set forth in claim 1, wherein said non-linear electric resistance means comprises the combination of a varistor and a diode.

5. A voltage regulator as set forth in claim 1, wherein said non-linear electric resistance means comprises a Zener diode and a linear electric resistor.

* * * * *